United States Patent
Chaudhuri et al.

(10) Patent No.: US 9,894,648 B2
(45) Date of Patent: Feb. 13, 2018

(54) METHODS AND SYSTEMS FOR PROVIDING DEVICE TO DEVICE PROXIMITY SERVICES IN WIRELESS COMMUNICATION NETWORKS

(71) Applicant: Wipro Limited, Bangalore (IN)

(72) Inventors: Saptarshi Chaudhuri, Bangalore (IN); Shyam Sundar Pal, Kolkata (IN)

(73) Assignee: WIPRO LIMITED, Bangalore (IN)

(*) Notice: Subject to any disclaimer, the term of this patent is extended or adjusted under 35 U.S.C. 154(b) by 0 days.

(21) Appl. No.: 15/070,423

(22) Filed: Mar. 15, 2016

(65) Prior Publication Data
US 2017/0257857 A1 Sep. 7, 2017

(30) Foreign Application Priority Data
Mar. 1, 2016 (IN) .............................. 201641007209

(51) Int. Cl.
| | | |
|---|---|---|
| H04W 72/00 | (2009.01) | |
| H04W 72/04 | (2009.01) | |
| H04L 12/26 | (2006.01) | |
| H04W 8/24 | (2009.01) | |
| H04W 76/02 | (2009.01) | |
| H04W 4/02 | (2009.01) | |
| H04W 8/00 | (2009.01) | |

(52) U.S. Cl.
CPC ........... *H04W 72/044* (2013.01); *H04L 43/16* (2013.01); *H04W 8/24* (2013.01); *H04W 76/023* (2013.01); *H04W 4/023* (2013.01); *H04W 8/005* (2013.01)

(58) Field of Classification Search
CPC .................................................. H04W 72/044
USPC ......................................................... 455/450
See application file for complete search history.

(56) References Cited

U.S. PATENT DOCUMENTS

| | | |
|---|---|---|
| 2013/0324114 A1 | 12/2013 | Raghothaman et al. |
| 2015/0245193 A1 | 8/2015 | Xiong et al. |
| 2015/0373730 A1* | 12/2015 | Fujishiro ............... H04L 1/0003 455/450 |

(Continued)

FOREIGN PATENT DOCUMENTS

WO  WO 2015/062670 A1  5/2015

OTHER PUBLICATIONS

European Search Report, dated Sep. 19, 2017, (7 pages).

*Primary Examiner* — Charles Shedrick
(74) *Attorney, Agent, or Firm* — Finnegan, Henderson, Farabow, Garrett & Dunner, LLP (57) ABSTRACT

Methods and systems for providing Device to Device (D2D) proximity services in wireless communication networks are disclosed. In an embodiment, the method includes comparing a set of predefined proximity service parameters for a plurality of UEs with associated thresholds within a set of thresholds; creating a UE proximity group comprising a set of neighboring UEs selected from the plurality of UEs based on the comparing, wherein the set of neighboring UEs communicate amongst each other through at least one Base Station (BS) bypassing a core network of the wireless communication network; monitoring each of the set of predefined proximity service parameters to determine deviation with an associated threshold; and modifying the UE proximity group in response to determining deviation between at least one of the set of predefined proximity service parameters and an associated threshold.

18 Claims, 5 Drawing Sheets

(56) References Cited

U.S. PATENT DOCUMENTS

2016/0037569 A1* 2/2016 Kim ................... H04W 4/008
                                                        455/450
2016/0128053 A1* 5/2016 Wei ................... H04W 8/005
                                                        455/450
2016/0192424 A1* 6/2016 Suzuki ................ H04W 8/005
                                                        370/328

* cited by examiner

METHODS AND SYSTEMS FOR PROVIDING DEVICE TO DEVICE PROXIMITY SERVICES IN WIRELESS COMMUNICATION NETWORKS

TECHNICAL FIELD

This disclosure relates generally to wireless communication networks, and more particularly to methods and systems for providing device to device proximity services in wireless communication networks.

BACKGROUND

The increasing number of smart devices that have wireless capabilities has an impact on the quality of service received by users in wireless communication networks. As a result, there is a need for Device to Device (D2D) communication in wireless communication networks in order to improve user experience, resource utilization, and to reduce the load on the core network.

The 3GPP specification proposes a technique called Proximity-Based Services (ProSe) for enabling D2D communication between paired devices that are in proximity of each other. Devices using ProSe need not route the communication through the core network and the communication can be assisted by BSs alone. However, these conventional systems fail to ensure reliable communication and guarantee of data delivery in D2D communication under ProSe. Moreover, the likelihood of selecting a wrong D2D partner is high, which in turn results in poor quality of communication affecting throughput of the wireless communication network.

SUMMARY

In one embodiment, a method of providing communication amongst User Equipments (UEs) in a wireless communication network is disclosed. The method includes comparing a set of predefined proximity service parameters for a plurality of UEs with associated thresholds within a set of thresholds; creating a UE proximity group comprising a set of neighboring UEs selected from the plurality of UEs based on the comparing, wherein the set of neighboring UEs communicate amongst each other through at least one Base Station (BS) bypassing a core network of the wireless communication network; monitoring each of the set of predefined proximity service parameters to determine deviation with an associated threshold; and modifying the UE proximity group in response to determining deviation between at least one of the set of predefined proximity service parameters and an associated threshold.

In another embodiment, a BS providing communication amongst User Equipments (UEs) in a wireless communication network is disclosed. The BS includes a processor configured to compare a set of predefined proximity service parameters for a plurality of UEs with associated thresholds within a set of thresholds; create a UE proximity group comprising a set of neighboring UEs selected from the plurality of UEs based on the comparing, wherein the set of neighboring UEs communicate amongst each other through at least one BS bypassing a core network of the wireless communication network; monitor each of the set of predefined proximity service parameters to determine deviation with an associated threshold; and modify the UE proximity group in response to determining deviation between at least one of the set of predefined proximity service parameters and an associated threshold.

In yet another embodiment, a non-transitory computer-readable storage medium for determining radio coverage in a wireless communication network is disclosed, such that when executed by a computing device, the non-transitory computer-readable storage medium cause the computing device to compare a set of predefined proximity service parameters for a plurality of UEs with associated thresholds within a set of thresholds; create a UE proximity group comprising a set of neighboring UEs selected from the plurality of UEs based on the comparing, wherein the set of neighboring UEs communicate amongst each other through at least one BS bypassing a core network of the wireless communication network; monitor each of the set of predefined proximity service parameters to determine deviation with an associated threshold; and modify the UE proximity group in response to determining deviation between at least one of the set of predefined proximity service parameters and an associated threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
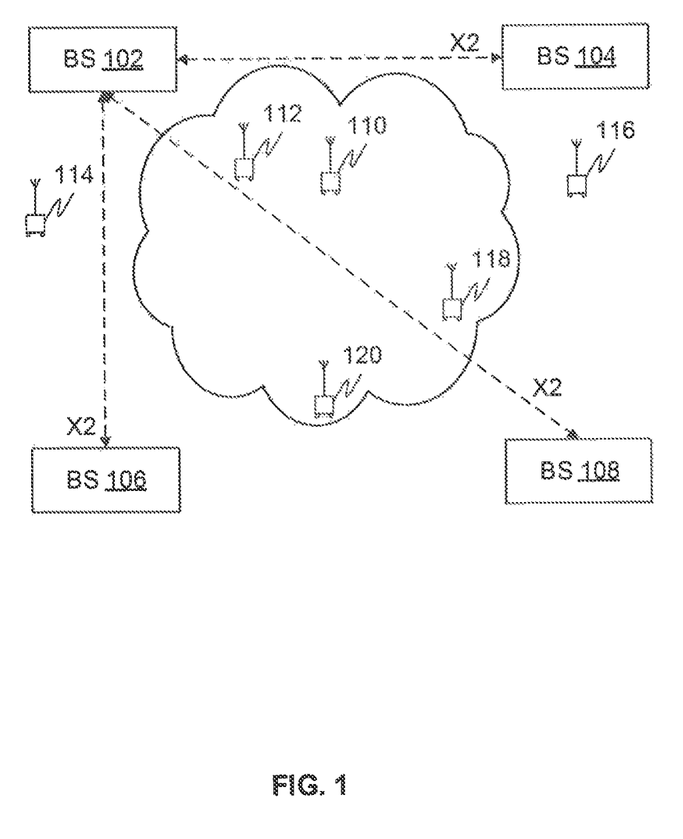
FIG. 1 illustrates an exemplary wireless communication network in which various embodiments may function.

Additional illustrative embodiments are listed below. In one embodiment, an exemplary wireless communication network 100 in which various embodiments may function is illustrated in FIG. 1. Wireless communication network 100 may be a Long Term Evolution (LTE) network that includes a Base Station (BS) 102, a BS 104, a BS 106, and a BS 108. BSs 102-108 may be Evolved Node Base station (eNB) and may communicate amongst each other through an X2 interface. BS 102 is the Serving BS (SBS) for a User Equipment (UE) 110, a UE 112, and a UE 114, while BS 102 is the Neighboring BS (NBS) for UE 116 and UE 118. BS 104 is the SBS for UE 116 and the NBS for UE 118 and UE 110. Further, BS 106 is the SBS for UE 118 and the NBS for UE 116. UE 120 is out of coverage area of each of BS 102, 104, 106, and 108. Examples of a UE may include but are not limited to a cell phone, a smart phone, a tablet, a phablet, and a laptop. eNB 102 and eNB 104 form the evolved UMTS Terrestrial Radio Access Network (E-UTRAN) for wireless communication network 100.

In wireless communication network 100, UE 110, UE 112, and UE 118 are in close proximity with each other, such that UE 110 and UE 112 are within coverage area of BS 102 and UE 118 is within coverage area of BS 106. As a result, UE 110, UE 112, and UE 118 may use D2D communication for proximity service. However, UE 114, irrespective of being in the same coverage area as UE 110 and UE 112, is not in close proximity with UE 110, UE 112, and UE 118. As a result, UE 114 cannot participate in D2D communication for proximity service. Moreover, even when UE 120 is out of coverage area of each of BS 102, 104, 106, and 108, it can participate in D2D communication for proximity service with UE 118 as they are in close proximity if each other.

It will be apparent to a person skilled in the art that wireless communication network 100 is not limited to an LTE network and may include but is not limited to Worldwide Interoperability for Microwave Access (WiMAX), Code Division Multiple Access (CDMA), Enhanced Data rates for GSM Evolution (EDGE), and High Speed Packet Access (HSPA). It will be further apparent to a person skilled in the art that for a wireless communication network other than LTE, network components and parameters associated with that wireless communication network will be used.

Figure 2:
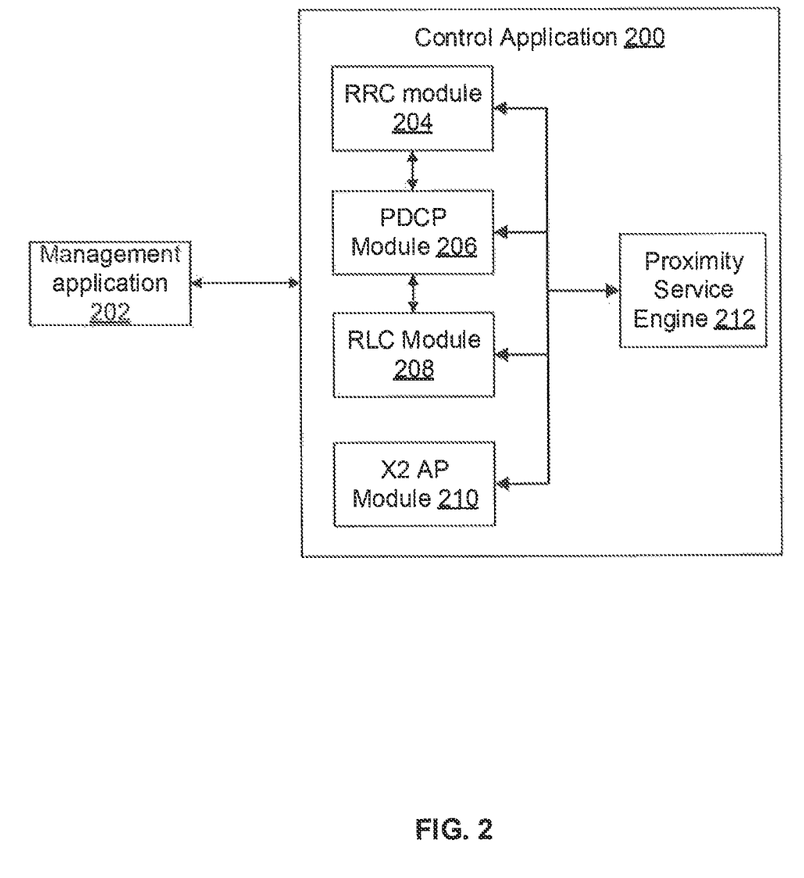
FIG. 2 is a block diagram illustrating communication of various components of a control application with a management application in a Base Station (BS), in accordance with an embodiment

FIG. 2 is a block diagram illustrating communication of various components of a control application 200 with a management application 202 in a Base Station (BS), in accordance with an embodiment. Control application 200 includes a Radio Resource Controller (RRC) module 204, a Packet Data Convergence Protocol (PDCP) module 206, a Radio Link Control (RLC) module 208, an X2 Application Protocol (AP) module 210, and a proximity service engine 212.

Management application 202 performs necessary configuration at initiation of the system and stores it as management application configuration data in its persistent memory. It also receives global information for configuring global data specific to BSs during start-up of the system for configuring BS. Management application 202 include configuration data associated with each of RRC module 204, PDCP module 206, X2 AP module 210, proximity service engine 212, and BSs. Configuration data associated with RRC module 204 may include, but is not limited to AntennaInfo, CQI-ReportConfig, LogicalChannelConfig, MAC-MainConfig, PDCP-Config. Further, configuration data for BSs may include, but is not limited to BS transmission power, BS Cell ID, location of a BS, and number of sectors in coverage area of a BS.

At initiation of the system, control application 200 receives proximity determination configuration information from management application 202 through a management application interface (not shown in FIG. 2). This information is then stored in persistent memory of proximity service engine 212 to be used as local-configuration. Thereafter, proximity service engine 212 extracts necessary configuration information for providing proximity communication service by accessing local configuration of proximity service engine 212. This extracted information is used to determine UEs for which proximity service can be made available and accordingly, proximity service engine 212 updates configuration information in its persistent-memory. Control application 200 uses the updated configuration information to configure various BS components.

Additionally, proximity service engine 212 communicates with each of RRC module 204, PDCP module 206, RLC module 208, and an X2 AP module 210 to provide assistance to UEs for proximity communication service. For example, proximity service engine 212 interacts with RRC module 204 to retrieve measurement information associated with UEs. The measurement information may include, but is not limited to Reference Signal Received Power (RSRP) and location of UE. Further, proximity service engine 212 retrieves data ciphering and integrity information from PDCP module 206. Proximity service engine 212 retrieves transmission mode information, which may include, but is not limited to acknowledge mode, un-acknowledge mode, and transparent mode from RLC module 208. This information may further be provided to PDCP module 206. Further, proximity service engine 212 retrieves information about UEs in being served by NBSs from X2 AP module 210. Such information may include, but is not limited to UE location and UE measurement reports received by the NBS.

To obtain initial configuration, proximity service engine 212 retrieves a list of default NBSs and a set of predefined proximity service parameters from management application 202. Thereafter, proximity service engine 212 stores the set of predefined proximity service parameters in its persistent memory. The predefined proximity service parameters include data for a service, data for a service, a timer for proximity service, number of UEs, distance between UEs, and data transfer rate between UEs. Proximity service engine 212 compares the set of predefined proximity service parameters for UEs with associated thresholds within a set of thresholds. In other words, each proximity service parameter is compared with its threshold. This comparison is then used to create a UE proximity group that includes a set of neighboring UEs, which communicate amongst each other through one or more BSs bypassing a core network of wireless communication network 100. In other words, only the set of neighboring UEs and the one or more BSs are involved to facilitate proximity communication service. In an embodiment, the predefined proximity service parameters and their associated thresholds may be represented using table 1 given below:

TABLE 1

| Proximity Service Parameter | Associated Threshold | Description |
| --- | --- | --- |
| Data for a Service | $DataServ_{th}$ | This is the value of data rate of different types of data services in device to device proximity communication. |

TABLE 1-continued

| Proximity Service Parameter | Associated Threshold | Description |
|---|---|---|
| | | If for a particular service, this value is higher than $DataServ_{th}$, the allowed data may be more than required by that service. This would result in lower utilization of network resources. However, if this value is lower than $DataServ_{th}$, the throughput for the service may be clipped at a lower value, thereby affecting the service. |
| Timer for Proximity Service (ProSe) | $TimerProSe_{th}$ | This timer is initiated at the time of creation or modification of a UE proximity group. If this value is higher than $Timer_{prose}$, large number of UEs that have come in proximity of each other will not be included in the UE proximity group. Moreover, if a large number of UEs exit from within the proximity area of the UE proximity group, these UEs will not be excluded from the UE proximity group. Both these scenarios would result in unreliable D2D proximity communication service. However, if this value is lower than $Timer_{prose}$, UE proximity group will be created very frequent, resulting in lower service throughput. |
| Number of UE in a UE Proximity Group (UEGroup) | $UEGroup_{th}$ | This value indicates the number of UEs for which proximity communication services have been enabled. If this value is higher than $UEGroup_{th}$, the UE proximity group would include large number of UEs resulting in unreliable D2D proximity communication service and required service throughput would not be provided. However, if this value is lower than $UEGroup_{th}$, the allowed data would be more than what is required by the services, resulting in lower utilization of network resources. |
| Data Transfer Rate ($DataTransfer_{rate}$) | $DataTransfer_{rate\_min}$ | This is the data transfer rate value between two UEs that are participating in D2D proximity communication service based for different types of communication services. If this value is higher than $DataTransfer_{rate\_min}$, reliable D2D proximity communication service and required service throughput would be affected. If this value is lower than $DataTransfer_{rate\_min}$, the service throughput may be clipped at a lower value affecting that service. |
| Distance between UEs (UEDist) | $UEDist_{th}$ | This is the distance between two UEs and is considered to take a decision on whether the UEs can participate in D2D proximity communication service. If this value is higher than $UEDist_{th}$, the UE proximity group will fail to provide reliable D2D proximity communication service and required throughput. However, if this value is lower than $UEDist_{th}$, excessive number of UEs may be added to the UE proximity group. As a result, required service throughput would not be provided. |

After creating the UE proximity group, proximity service engine 212 monitors each of the set of predefined proximity service parameters to determine deviation with an associated threshold. In other words, a proximity service parameter is monitored and its value is compared with threshold for that proximity service parameter. For example, the value of data transfer rate for a proximity communication service between two UEs is compared with $DataTransfer_{rate\_min}$. If any deviation is determined between a predefined proximity service parameters and its associated threshold, the UE proximity group is modified. This is further explained in detail in conjunction with FIG. 3.

Figure 3:
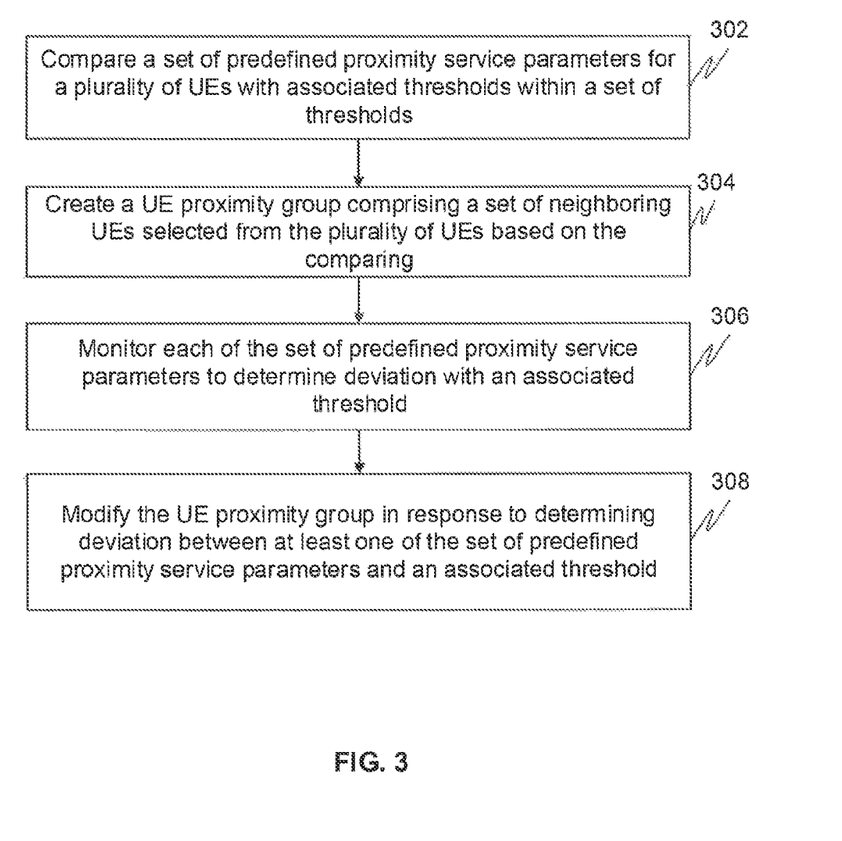
FIG. 3 illustrates a flowchart of a method for providing communication amongst User Equipments (UEs) in a wireless communication network, in accordance with an embodiment.

FIG. 3 illustrates a flowchart of a method for providing communication amongst UEs in a wireless communication network, in accordance with an embodiment. At initialization, proximity service engine 212 retrieves the set of predefined proximity service parameters and the associated thresholds from management application 202. The set of predefined proximity service parameters may include, but are not limited to data for a service, data for a service, a timer for proximity service, number of UEs, distance between UEs, and data transfer rate between UEs. These parameters and associated thresholds have been explained in detail in conjunction with Table 1 given in FIG. 2 above. The set of predefined proximity service parameters are then configured in proximity service engine 212 and stored in a local copy of its persistent memory.

However, in case there is a change in the configuration, then proximity service engine 212 receives configuration information of BSs in the wireless communication network from management application 202. Based on this, the latest set of predefined proximity service parameters and the associated thresholds are configured in proximity service engine 212 and stored in a local copy of its persistent memory.

Thereafter, a plurality of UEs that are in proximity are discovered in coverage area of BSs in the wireless communication network. For example, UEs in the coverage area of BS 102, 104, 106, and 108, which are in proximity of each other, are discovered. In an exemplary embodiment, the plurality of UEs are discovered as described as below:

Step 1: Proximity service engine 212 receives information on coverage area of a SBS and its NBSs. For example, BS 102 is the SBS, then each of BS 104, 106 and 108 is an NBS.

Step 2: Information for coverage area of each NBS is stored as $NBSCov_{info}$ in the persistent memory of proximity service engine 212.

Step 3: The timer for proximity communication service is initiated

Step 4: Total number of UEs in the coverage are determined as $UE_{Num}$

Step 5: For each UE in coverage area of the SBS, UE discovery is performed using following:
  1. The total number of discovered UEs in proximity is determined as $DisUE_{Count}$
  2. Location of each discovered UE is determined as $DisUE_{Loc}$ (x,y), where x, y are co-ordinates of a discovered UE.
  3. Information for each discovered UE in each NBS of the SBS is stored in persistent memory of proximity service engine 212 as:

$$DisUE_{Info}(DisUE_{Count}, DisUE_{Loc}(x,y))$$

After discovering the plurality of UEs, an assessment to determine number UEs amongst total number of UEs of an SBS that have D2D connectivity permission. In continuation of the exemplary embodiment given above, for each UE in $UE_{Num}$, this assessment is performed as described below:

Step 1: For each discovered UE in $DisUE_{Count}$, a check is performed to see if each UE is permitted D2D connections.

Step 2: Information for UEs that are permitted D2D connections is stored in the persistent memory of proximity service engine 212 as $UE_{perm}(DisUE_{Loc}(x,y))$ At 302, proximity service engine 212 compares the set of predefined proximity service parameters for UEs that are permitted D2D connections with associated thresholds. This is done in order to determine feasibility of D2D connection for these UEs. In continuation of the exemplary embodiment given above, proximity service engine 212 assesses feasibility of D2D connections for the UEs as described below:

Step 1: For each UE in $DisUE_{Count}$, proximity service engine 212 retrieves the set of predefined proximity service parameters from management application 202 and stores them in persistent memory of proximity service engine 212

Step 2: For each UE in $UE_{Num}$, proximity service engine 212 determines the data service required by each UE and whether the required data service can be served through ProSe data path. Consider each UE that satisfies this criterion for D2D proximity communication service Step 3: For each UE in $UE_{Num}$, proximity service engine 212 obtains SBS attached UE report and stores as $SBS\_UE_{Report}$ in its persistent memory. For each discovered UE in $DisUE_{Count}$, proximity service engine 212 obtains NBS attached UE report through X2 interface and stores as $NBS\_UE_{Report}$.

Thereafter, at 304, a UE proximity group that includes a set of neighboring UEs is created based on the comparing done at 302. For example, the set of neighboring UEs may include UE 110, UE 112, and UE 118. The set of neighboring UEs communicate amongst each other through one or more BSs without passing through a core network of the wireless communication network. In an embodiment, the UE proximity group may be created based on location of one or more neighboring UEs in the set. In another embodiment, the UE proximity group may be created based on one or more services required by one or more neighboring UEs in the set. In continuation of the exemplary embodiment given above, proximity service engine 212 creates a UE proximity group based on location using steps described below performed for each UE in $UE_{Num}$:

Step 1: Extract location for a UE in $DisUE_{Loc}$ (x,y)

Step 2: For each discovered UE in $DisUE_{Count}$, proximity service engine 212 performs the following:
  1. Extract location of discovered UE in $DisUE_{Loc}$ (x,y)
  2. Calculate distance between the UE and each discovered UE and store as $UE_{Dist}$
  3. Calculate the average distance for each $UE_{Dist}$ calculated above and store as $Dist_{Avg}$ and store in persistent memory of proximity service engine 212
  4. Compare $UE_{Dist}$ of a discovered UE with $UEDist_{th}$. If $UE_{Dist} < UEDist_{th}$, the discovered UE is considered as probable candidate for D2D proximity communication service and stored as $ProSe_{cand\_prob}$ in persistent memory of proximity service engine 212.

In further continuation of the exemplary embodiment given above, proximity service engine 212 creates the UE proximity group based on service using steps described below:

Step 1: For each discovered UE in $ProSe_{cand\_prob}$, perform the following:
  1. Determine data service ($Data_{Serv}$) required by a discovered UE and compare it with $DataServ_{th}$. If $Data_{Serv} < DataServ_{th}$, store the discovered UE as final candidate $ProSe_{cand\_final}$ for D2D proximity communication service in persistent memory of proximity service engine 212.
  2. Calculate average data rate, i.e., $DataRate_{Avg}$ for each service and store in persistent memory of proximity service engine 212

Step 2: For each UE in $UE_{Num}$ and for each discovered UE in $ProSe_{cand\_final}$ perform the following:
  1. Determine proximity communication service required by SBS as $Data_{Serv}$
  2. Determine service received by a discovered UE as $DiscData_{Serv}$
  3. Create a UE proximity group in a particular service category as $UEGroup_{ServCat}$ After the UE proximity group has been created, proximity service engine 212 determines one or more proximity service data paths for one or more services required by the one or more neighboring UEs in the UE proximity group. In continuation of the exemplary embodiment given above, proximity service engine 212 determines service data paths for each UE in $UE_{Num}$ as described below:

Step 1: Determine different services required by SBS UE as $UE_{Servdiff}$

Step 2: Check service required by D2D proximity communication service required from $Data_{Serv}$ Step 3: Store proximity service data path between the SBS UE and a discovered UE as DataPath(Data$_{Serv}$) in persistent memory of proximity service engine 212

Step 4: Store non proximity service data path as DfDataPath(Data$_{Serv}$) in persistent memory of proximity service engine 212

Thereafter, proximity service engine 212 establishes one or more communication channels based on the one or more proximity service data paths by allocating resource to one or more neighboring UEs. In continuation of the exemplary embodiment given above, proximity service engine 212 may establish communication channels for each UE in UE$_{Num}$ as described below:

Step 1: For each discovered UE in ProSe$_{cand\_final}$, proximity service engine 212 performs the following:
1. Extract data path information from DataPath (Data$_{Serv}$)
2. Allocate resource at SBS UE and establish a communication channel After the one or more communication channels have been established, at 306, proximity service engine 212 monitors each of the set of predefined proximity service parameters to determine deviation with an associated threshold. In continuation of the exemplary embodiment given above, proximity service engine 212 determines deviation between a proximity service parameter and an associated threshold for each UE in UE$_{Num}$ by performing the steps given below for each discovered UE in ProSe$_{cand\_final}$:

Step 1: Calculate data transferred rate at each discovered UE as DataTransfer$_{Rate}$ Step 2: Compare DataTransfer$_{Rate}$ with associated threshold. If DataTransfer$_{Rate}$<DataTransfer$_{rate\_min}$, denote the UE proximity group as modifiable UE Group: ProSe$_{Modify}$ Thereafter, at 308, proximity service engine 212 modifies the UE proximity group in response to determining deviation between one or more of the set of predefined proximity service parameters and associated thresholds. The UE proximity group is modified by selecting a secondary set of neighboring UEs from the plurality of UEs. The selection is made, such that, each of the set of predefined proximity service parameters for the secondary set of neighboring UEs are in conformance with an associated threshold within the set of thresholds. In other words, every proximity service parameter for a UE is either greater than or less than an associated threshold, as is required by the system.

In case, proximity service engine 212 is not able to create UE proximity groups, it adjusts one or more thresholds in the set of thresholds based on network parameters and historical threshold data. This is further explained in detail in conjunction with FIG. 4. In continuation of the exemplary embodiment given above, proximity service engine 212 adjust one or more of the set of thresholds associated with the set of predefined proximity service parameters as described below:

Step 1: Proximity service engine 212 adjusts TimerProSe$_{th}$ by performing following:

---

1. Check if Num(ProSe$_{cand\_final}$) < UEGroup$_{th}$ ± UEGroup$_{adj}$, where,
   UEGroup$_{adj}$ is adjustment factor for UEGroup$_{th}$
2. When TimerProSe < TimerProSe$_{th}$,
   TimerProSe$_{th}$ = TimerProSe$_{th}$ + Timer$_{adj}$,
   Else, when TimerProSe > TimerProSe$_{th}$,
   TimerProSe$_{th}$ = TimerProSe$_{th}$ − Timer$_{adj}$,
   where,
   Timer$_{adj}$ is adjustment factor for TimerProSe$_{th}$

---

Step 2: Proximity service engine 212 adjusts UEGroup$_{th}$ by performing following:

---

1. Checks if DataTranfer$_{Rate}$ = DataTransfer$_{rate\_min}$ ± DataAdj$_{fact}$, where,
   DataAdj$_{fact}$ is adjustment factor for DataTransfer$_{rate\_min}$
2. Checks if Dist$_{Avg}$ = UEDist$_{th}$ ± UEDist$_{adj}$ where,
   UEDist$_{adj}$ is adjustment factor for UEDist$_{th}$
3. When both 1 and 2 are true, and when UEGroup < UEGroup$_{th}$,
   UEGroup$_{th}$ = UEGroup$_{th}$ + UEGroup$_{adj}$,
   Else when UEGroup > UEGroup$_{th}$,
   UEGroup$_{th}$ = UEGroup$_{th}$ − UEGroup$_{adj}$,
   where,
   UEGroup$_{adj}$ is adjustment factor for UEGroup$_{th}$

---

Step 3: Proximity service engine 212 adjusts UEDist$_{th}$ by performing following:

---

1. Checks if Num (ProSe$_{cand\_final}$) < UEGroup$_{th}$ ± UEGroup$_{adj}$
2. if 1 is true and if UEDist < UEDist$_{th}$,
   UEDist$_{th}$ = UEDist$_{th}$ + UEDist$_{adj}$,
   Else if UEDist > UEDist$_{th}$,
   UEDist$_{th}$ = UEDist$_{th}$ − UEDist$_{adj}$

---

As the UE proximity group is created based on comparison of proximity service parameters for UEs with associated thresholds, selection of appropriate UE partner for D2D communication is enabled. Moreover, as the UE proximity group is dynamically modified when a deviation is detected between one or more proximity service parameters and associated thresholds, data delivery is guaranteed and required throughput for reliable and high speed communication is maintained. Additionally, the associated thresholds for the proximity service parameters are adjusted over a period of time based on historical data and other network parameters in order to increase the efficiency in creating appropriate UE proximity groups.

Figure 4:
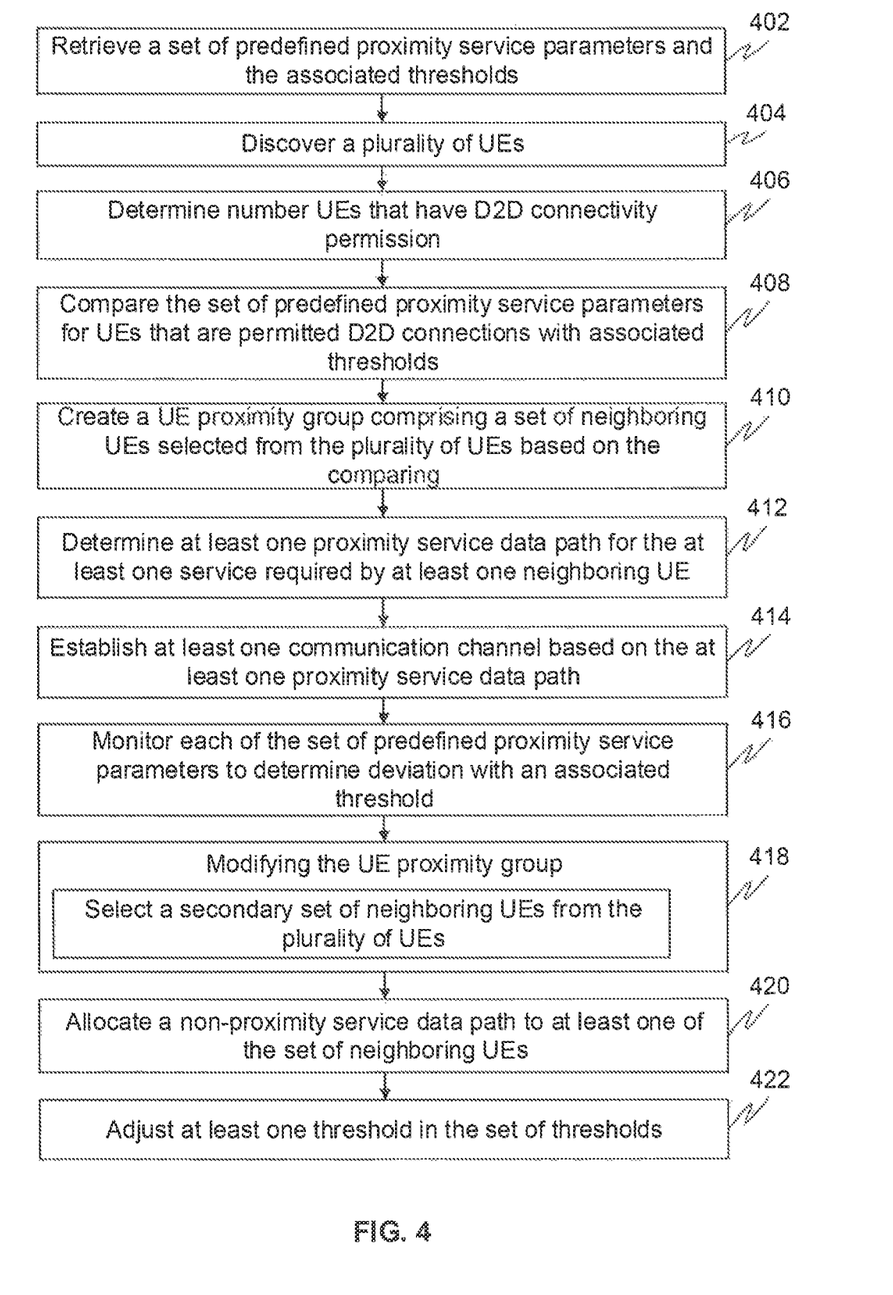
FIG. 4 illustrates a flowchart of a method for providing communication amongst UEs in a wireless communication network, in accordance with another embodiment.

FIG. 4 illustrates a flowchart of a method for providing communication amongst UEs in a wireless communication network, in accordance with another embodiment. At 402, proximity service engine 212 retrieves a set of predefined proximity service parameters and the associated thresholds from management application 202. Thereafter, at 404, proximity service engine 212 discovers a plurality of UEs and at 406, determines the number of UEs that have D2D connectivity permission. This has been explained in detail in conjunction with FIG. 3.

At 408, proximity service engine 212 compares the set of predefined proximity service parameters for UEs that are permitted D2D connections with associated thresholds. Based on the comparison, at 410, proximity service engine 212 creates a UE proximity group comprising a set of neighboring UEs selected from the plurality of UEs. Thereafter, at 412, proximity service engine 212 determines at least one proximity service data path for the at least one service required by at least one neighboring UE. Proximity service engine 212 then establishes at least one communication channel based on the at least one proximity service data path at 414. This has been explained in detail in conjunction with FIG. 3.

To monitor the established communication channels, proximity service engine 212 monitors each of the set of predefined proximity service parameters to determine deviation with an associated threshold at 416. In case any deviation is observed, proximity service engine 212 modifies the UE proximity group at 418. The UE proximity group is modified by selecting a secondary set of neighboring UEs from the plurality of UEs. The selection is made, such that, each of the set of predefined proximity service parameters for the secondary set of neighboring UEs are in conformance with an associated threshold within the set of thresholds. This has been explained in detail conjunction with FIG. 3.

After the UE proximity group has been modified, at 420, proximity service engine 212 allocated a non-proximity service data path to one or more UEs in the set of neighboring UEs that are no longer included in the modified UE proximity group. Unlike proximity service data path, the non-proximity service data path is routed through the core network. In continuation of the exemplary embodiment given in FIG. 3, proximity service engine 212 allocates non-proximity service data path by performing following for each UE in $UE_{Num}$:

Step 1: Obtain modifiable UE proximity group from $ProSe_{Modify}$.

Step 2: Change service category data path to non-proximity service data path for each UE in $ProSe_{Modify}$.

At 422, in case, proximity service engine 212 is not able to create UE proximity groups, it adjusts one or more thresholds in the set of thresholds based on network parameters and historical threshold data. In continuation of the exemplary embodiment given in FIG. 3, proximity service engine 212 adjust one or more of the set of thresholds associated with the set of predefined proximity service parameters as described below:

Step 1: Proximity service engine 212 adjusts $TimerProSe_{th}$ by performing following:

---

3. Check if $Num(ProSe_{cand\_final}) < UEGroup_{th} \pm UEGroup_{adj}$,
   where,
   $UEGroup_{adj}$ is adjustment factor for $UEGroup_{th}$
4. When $TimerProSe < TimerProSe_{th}$,
   $TimerProSe_{th} = TimerProSe_{th} + Timer_{adj}$
   Else, when $TimerProSe > TimerProSe_{th}$,
   $TimerProSe_{th} = TimerProSe_{th} - Timer_{adj}$,
   where,
   $Timer_{adj}$ is adjustment factor for $TimerProSe_{th}$

---

Step 2: Proximity service engine 212 adjusts $UEGroup_{th}$ by performing following:

---

4. Checks if $DataTransfer_{Rate} = DataTransfer_{rate\_min} \pm DataAdj_{fact}$,
   where,
   $DataAdj_{fact}$ is adjustment factor for $DateTransfer_{rate\_min}$
5. Checks if $Dist_{Avg} = UEDist_{th} \pm UEDist_{adj}$
   where,
   $UEDist_{adj}$ is adjustment factor for $UEDist_{th}$
6. When both 1 and 2 are true, and when $UEGroup < UEGroup_{th}$,
   $UEGroup_{th} = UEGroup_{th} + UEGroup_{adj}$,
   Else when $UEGroup > UEGroup_{th}$,
   $UEGroup_{th} = UEGroup_{th} - UEGroup_{adj}$,
   where,
   $UEGroup_{adj}$ is adjustment factor for $UEGroup_{th}$

---

Step 3: Proximity service engine 212 adjusts $UEDist_{th}$ by performing following:

---

3. Checks if $Num (ProSe_{cand\_final}) < UEGroup_{th} \pm UEGroup_{adj}$
4. if 1 is true and if $UEDist < UEDist_{th}$,
   $UEDist_{th} = UEDist_{th} + UEDist_{adj}$,
   Else if $UEDist > UEDist_{th}$,
   $UEDist_{th} = UEDist_{th} - UEDist_{adj}$

---

Figure 5:
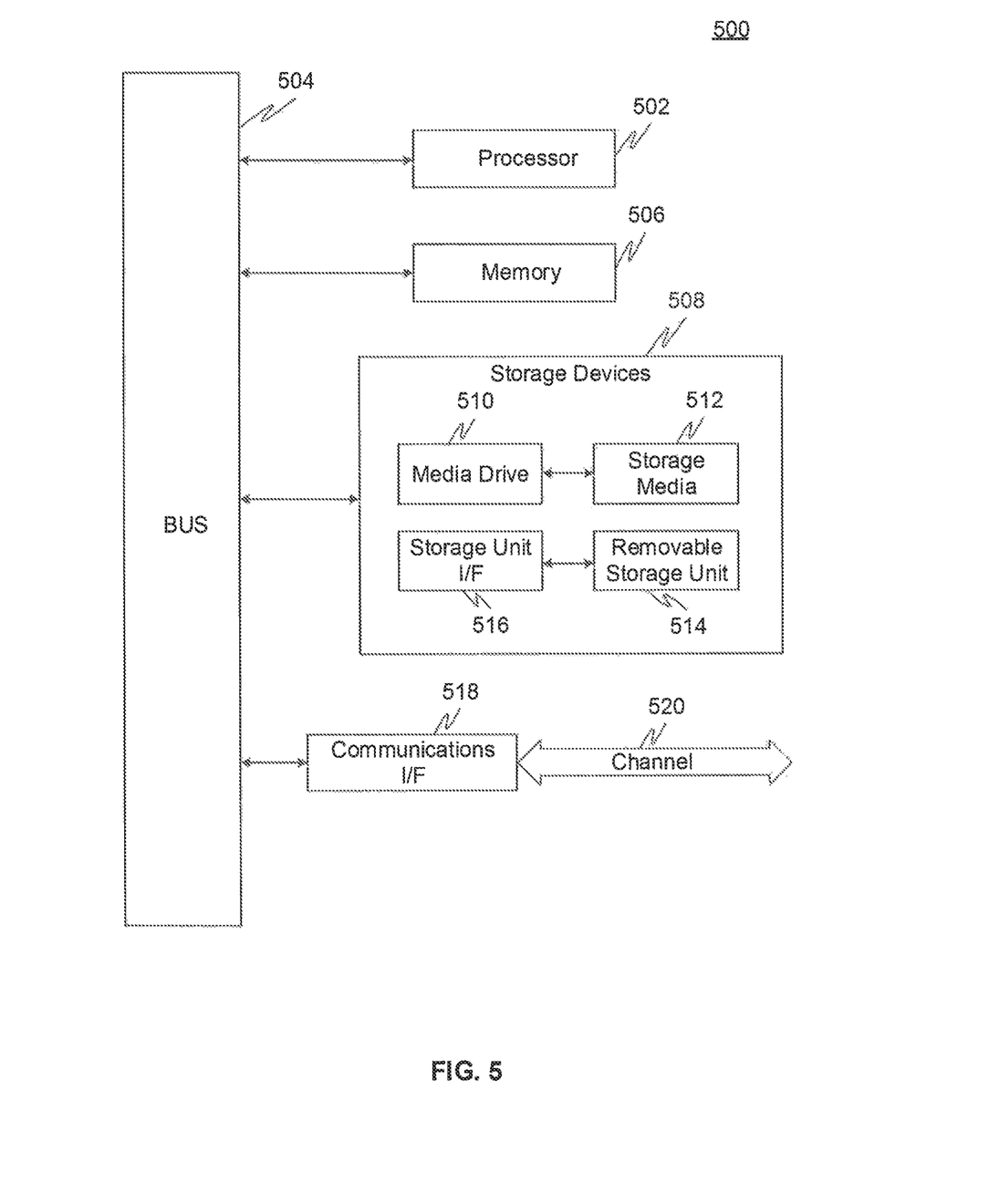
FIG. 5 illustrates an exemplary computing system that may be employed to implement processing functionality for various embodiments.

FIG. 5 illustrates an exemplary computing system 500 that may be employed to implement processing functionality for various embodiments (e.g., as a SIMD device, client device, server device, one or more processors, or the like). Those skilled in the relevant art will also recognize how to implement the invention using other computer systems or architectures. Computing system 500 may represent, for example, a user device such as a desktop, an activity mon monitoring device, a wearable portable electronic device, a mobile phone, personal entertainment device, DVR, and so on, or any other type of special or general purpose computing device as may be desirable or appropriate for a given application or environment. Computing system 500 can include one or more processors, such as a processor 502 that can be implemented using a general or special purpose processing engine such as, for example, a microprocessor, microcontroller or other control logic. In this example, processor 502 is connected to a bus 504 or other communication medium.

Computing system 500 can also include a memory 506 (main memory), for example, Random Access Memory (RAM) or other dynamic memory, for storing information and instructions to be executed by processor 502. Memory 506 also may be used for storing temporary variables or other intermediate information during execution of instructions to be executed by processor 502. Computing system 500 may likewise include a read only memory ("ROM") or other static storage device coupled to bus 504 for storing static information and instructions for processor 502.

Computing system 500 may also include storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by media drive 510. As these examples illustrate, storage media 512 may include a computer-readable storage medium having stored therein particular computer software or data.

In alternative embodiments, storage devices 508 may include other similar instrumentalities for allowing computer programs or other instructions or data to be loaded into computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from removable storage unit 514 to computing system 500.

Computing system 500 can also include a communications interface 518. Communications interface 518 can be used to allow software and data to be transferred between computing system 500 and external devices. Examples of communications interface 518 can include a network interface (such as an Ethernet or other NIC card), a communications port (such as for example, a USB port, a micro USB port), Near field Communication (NFC), etc. Software and data transferred via communications interface 518 are in the form of signals which can be electronic, electromagnetic, optical, or other signals capable of being received by communications interface 518. These signals are provided to communications interface 518 via a channel 520. Channel 520 may carry signals and may be implemented using a wireless medium, wire or cable, fiber optics, or other communications medium. Some examples of channel 520 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 506, storage devices 508, removable storage unit 514, or signal(s) on channel 520. These and other forms of computer-readable media may be involved in providing one or more sequences of one or more instructions to processor 502 for execution. Such instructions, generally referred to as "computer program code" (which may be grouped in the form of computer programs or other groupings), when executed, enable computing system 500 to perform features or functions of embodiments of the present invention.

In an embodiment where the elements are implemented using software, the software may be stored in a computer-readable medium and loaded into computing system 500 using, for example, removable storage unit 514, media drive 510 or communications interface 518. The control logic (in this example, software instructions or computer program code), when executed by processor 502, causes processor 502 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for methods and systems for providing D2D proximity services in wireless communication networks. As the UE proximity group is created based on comparison of proximity service parameters for UEs with associated thresholds, selection of appropriate UE partner for D2D communication is enabled. Moreover, as the UE proximity group is dynamically modified when a deviation is detected between one or more proximity service parameters and associated thresholds, data delivery is guaranteed and required throughput for reliable and high speed communication is maintained. Additionally, the associated thresholds for the proximity service parameters are adjusted over a period of time based on historical data and other network parameters in order to increase the efficiency in creating appropriate UE proximity groups.

The specification has described methods and systems for methods and systems for providing D2D proximity services in wireless communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing communication amongst User Equipments (UEs) in a wireless communication network, the method comprising:
   comparing a set of predefined proximity service parameters for a plurality of UEs with associated thresholds within a set of thresholds, wherein the set of predefined proximity parameters comprise a data service required by each UE of the plurality of UEs;
   creating a UE proximity group comprising a set of neighboring UEs selected from the plurality of UEs based on the data service required by each UE, wherein the set of neighboring UEs communicate amongst each other through at least one Base Station (BS) bypassing a core network of the wireless communication network;
   allocating resources to the set of neighboring UEs associated with the UE proximity group based on the data service required by each UE;
   monitoring each of the set of predefined proximity service parameters for the set of neighboring UEs to determine deviation with an associated threshold; and
   modifying the UE proximity group to include a secondary set of neighboring UEs from the plurality of UEs in response to determining deviation between at least one of the set of predefined proximity service parameters and an associated threshold.

2. The method of claim 1 further comprising determining at least one proximity service data path for at least one data service required by the set of neighboring UEs.

3. The method of claim 2 further comprising establishing at least one communication channel based on the at least one proximity service data path by allocating resource to the at least one neighboring UE.

4. The method of claim 1, wherein the set of predefined proximity service parameters are selected from a group comprising data for a service, a timer for proximity service, number of UEs, distance between UEs, and data transfer rate between UEs.

5. The method of claim 1, wherein each of the set of predefined proximity service parameters for the secondary set of neighboring UEs is in conformance with an associated threshold within the set of thresholds.

6. The method of claim 1 further comprising adjusting at least one threshold in the set of thresholds based on network parameters and historical threshold data.

7. The method of claim 1 further comprising allocating a non-proximity service data path to at least one of the set of neighboring UEs in response to modifying the UE proximity group, the non-proximity service data path being routed through the core network.

8. A Base Station (BS) for providing communication amongst User Equipments (UEs) in a wireless communication network, the BS comprising:
a processor configured to:
compare a set of predefined proximity service parameters for a plurality of UEs with associated thresholds within a set of thresholds, wherein the set of predefined proximity parameters comprise a data service required by each UE of the plurality of UEs;
create a UE proximity group comprising a set of neighboring UEs selected from the plurality of UEs based on the data service required by each UE, wherein the set of neighboring UEs communicate amongst each other through at least one Base Station (BS) bypassing a core network of the wireless communication network;
allocate resources to the set of neighboring UEs associated with the UE proximity group based on the data service required by each UE;
monitor each of the set of predefined proximity service parameters for the set of neighboring UEs to determine deviation with an associated threshold; and
modify the UE proximity group to include a secondary set of neighboring UEs from the plurality of UEs in response to determining deviation between at least one of the set of predefined proximity service parameters and an associated threshold.

9. The BS of claim 8, wherein the processor is further configured to determine at least one proximity service data path for at least one data service required by the set of neighboring UEs.

10. The BS of claim 9, wherein the processor is further configured to establish at least one communication channel based on the at least one proximity service data path by allocating resource to the at least one neighboring UE.

11. The BS of claim 8, wherein the set of predefined proximity service parameters are selected from a group comprising data for a service, a timer for proximity service, number of UEs, distance between UEs, and data transfer rate between UEs.

12. The BS of claim 8, wherein each of the set of predefined proximity service parameters for the secondary set of neighboring UEs is in conformance with an associated threshold within the set of thresholds.

13. The BS of claim 8, wherein the processor is further configured to adjust at least one threshold in the set of thresholds based on network parameters and historical threshold data.

14. The method of claim 1, wherein the processor is further configured to allocate a non-proximity service data path to at least one of the set of neighboring UEs in response to modifying the UE proximity group, the non-proximity service data path being routed through the core network.

15. A non-transitory computer-readable storage medium for providing communication amongst User Equipments (UEs) in a wireless communication network, cause the computing device to:
compare a set of predefined proximity service parameters for a plurality of UEs with associated thresholds within a set of thresholds, wherein the set of predefined proximity parameters comprise a data service required by each UE of the plurality of UEs;
create a UE proximity group comprising a set of neighboring UEs selected from the plurality of UEs based on the data service required by each UE, wherein the set of neighboring UEs communicate amongst each other through at least one Base Station (BS) bypassing a core network of the wireless communication network;
allocate resources to the set of neighboring UEs associated with the UE proximity group based on the data service required by each UE;
monitor each of the set of predefined proximity service parameters for the set of neighboring UEs to determine deviation with an associated threshold; and
modify the UE proximity group to include a secondary set of neighboring UEs from the plurality of UEs in response to determining deviation between at least one of the set of predefined proximity service parameters and an associated threshold.

16. The non-transitory computer-readable storage medium of claim 15, wherein the set of predefined proximity service parameters are selected from a group comprising data for a service, a timer for proximity service, number of UEs, distance between UEs, and data transfer rate between UEs.

17. The non-transitory computer-readable storage medium of claim 15, wherein each of the set of predefined proximity service parameters for the secondary set of neighboring UEs is in conformance with an associated threshold within the set of thresholds.

18. The non-transitory computer-readable storage medium of claim 15 further cause the computing device to adjust at least one threshold in the set of thresholds based on network parameters and historical threshold data.

* * * * *